3,491,044
ANTIOXIDANT SYSTEMS
Eric A. Meier, North Brunswick, and Hans H. Stockmann, Plainfield, N.J., assignors to National Starch and Chemical Corporation, New York, N.Y., a corporation of Delaware
No Drawing. Filed June 6, 1967, Ser. No. 643,841
Int. Cl. C08k *1/54, 1/30*
U.S. Cl. 260—27     6 Claims

ABSTRACT OF THE DISCLOSURE

Synergistic, terpene-based, antioxidant systems containing at least one rosin alcohol ester of thiodipropinonic acid in combination with a tris-isobornyl phenol primary antioxidant. The resulting antioxidative systems are effective stabilizers for such substrates as natural and synthetic polymers, rubbers, lubricants and oils, etc.

BACKGROUND OF THE INVENTION

Natural and synthetic polymers, rubbers, lubricants and oils, etc. are utilized in a wide variety of applications wherein, as a result of exposure to atmospheric conditions and/or elevated temperatures, thermal and oxidative degradation are frequently encountered. Such degradation is usually manifested by deterioration in appearance, physical properties, and performance on the part of the affected substrate.

The incorporation of a wide variety of additives has been proposed in an effort to find an effective means of stabilizing such substrates. In addition to providing effective stabilization, such additives must also possess other essential characteristics. Thus, they must be capable of being readily incorporated in the selected substrate; they must be compatible with such substrates; and, they must be able to provide extended stability thereto. Accordingly, such phenomena as the volatilization, exudation and migration of the additive must be kept to an absolute minimum so that the various substrates with which they are admixed can be provided with effective, long-lasting stabilization.

Few, if any, of the prior art stabilizing additives have proven entirely satisfactory. This lack of total effectiveness has been particularly evident in antioxidant systems consisting of primary and secondary antioxidant combinations; such secondary antioxidants serving to enhance the stabilizing performance of the primary antioxidants.

SUMMARY OF THE INVENTION

It is, thus the primary object of this invention to prepare antioxidant systems which exhibit a high degree of prolonged stabilizing effectiveness along with substrate compatibility. Various other objects and advantages of this invention will become apparent from the following description thereof.

We have now found that by combining tris-isobornyl phenol with at least one rosin alcohol ester of thiodipropionic acid, all of the previously described requirements for an effective antioxidant system are met. Thus, the resulting combinations exhibit outstanding synergistic antioxidant performance, i.e. the performance of the combinations substantially exceeds the sum total of the performances exhibited by the individual components thereof. These synergistic combinations are useful in any substrate wherein oxidative or thermal degradation is a problem.

The antioxidant systems of this invention comprise a primary antioxidant, i.e. tris-isobornyl phenol, combined with a secondary antioxidant selected from the class consisting of rosin alcohol esters of thiodipropionic acid corresponding to the formula

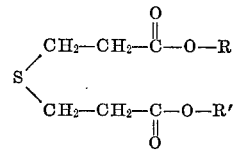

wherein R is a radical selected from the group consisting of abietyl, hydroabietyl, dehydroabietyl, tetrahydroabietyl, dihydroabietyl, levoprimaryl and dextropimaryl radicals, and $R_2$ is a radical independently selected from the group consisting of abietyl, hydroabietyl, dehydroabietyl, tetrahydroabietyl, dihydroabietyl, levoprimaryl, dextropimaryl, alkyl, cycloalkyl, aralkyl and aryl radicals.

DETAILED DESCRIPTION OF THE INVENTION

The latter alcohol esters, and the metods which may be used for their preparation, are described in greater detail in our copending U.S. application, filed of even data herewith, Ser. No. 643,837, filed June 6, 1967, and assigned to the assignee of the subject application, and said application is to be considered fully incorporated herein.

In general, there are several methods which may be effectively utilized to prepare the novel rosin alcohol esters of this invention. Thus, for example, a direct esterification procedure may be utilized wherein the thiodipropionic acid is directly esterified with the specified rosin alcohol. Such procedures are typically conducted at temperatures ranging from about 50° to 300° C. in the presence of acidic catalysts including mineral acids such as sulfuric, phosphoric and chlorosulfonic acids; acids salts such as magnesium bisulfate; organic sulfonic acids such as benzenesulfonic and 4-toluene sulfonic acids as well as sulfonated polystyrene, etc. Although the reaction need not be conducted in a solvent system, such organic solvents as benzene, chlorobenzenes, nitrobenzenes, alkylbenzenes, alkanes and chlorinated alkanes, etc. may be utilized in order to facilitate the reaction and to overcome any solubility difficulties which may be encountered. Furthermore, the system should be provided with mechanical means for removing the water that is formed as a by-product of the reaction, thus insuring that the esterification reaction is driven to completion.

Where it is desired to only partially esterify the thiodipropionic acid with the rosin alcohols, i.e. to esterify only one carboxyl group thereof, the second carboxyl group may be simultaneously reacted with higher, non-rosin alcohols by means of the above described direct esterification procedure. The latter higher, non-rosin alcohols include fatty acid alcohols containing from about 12 to 22 carbon atoms therein such as lauryl alcohol, myristyl alcohol, steryl alcohol and oleyl alcohol; cyclic alcohols such as 3,3,5-trimethylcyclohexanol, octylcyclohexanol, nonylcyclohexanol, cyclododecanol, diphenylcarbinol, tetrahydropyran-2-methanol, hexahydrobenzyl alcohol, 5-hydroxymethyl-2-norbornene, 1,2,3,4 - tetrahydro-2-naphthol, 5 - hydroxy-1,2,3a,4,5,6,7,7a-octahydro-4,7-methanoindene, etc.; and, glycols such as ethylene glycol, propylene glycol, 1,4-cyclohexanedimethanol, and xylene glycol, etc. The resulting mixed esters often exhibit additional advantageous properties such, for example, as the fact that the mixed esters containing fatty acid moieties can be prepared as solids, while the cyclic alcohol mixed esters possess surprisingly low viscosities.

In either instance, the reaction is continued for a period of time which is sufficient to insure complete esterification of the carboxyl groups of the thiodipropionic acid.

Another method which is equally effective is a transesterification procedure wherein a dialkylthiodipropionate, such as dimethyl thiodipropionate, is transesterified with a rosin alcohol. The latter procedure is typically conducted at temperatures ranging from about 50 to 300° C. in the presence of acidic catalysts including mineral acids such as sulfuric, phosphoric and chlorosulfonic acids; acidic salts such as magnesium bisulfate; organic sulfonic acids such as benzenesulfonic and 4-toluene sulfonic acids as well as sulfonated polystyrene, etc. Although the reaction need not be conducted in a solvent system, such organic solvents as benzene, chlorobenzenes, nitrobenzenes, alkylbenzenes, alkanes, and chlorinated alkanes, and nitrated alkanes, etc. may be utilized to order to facilitate the reaction and to overcome any solubility difficulties which may be encountered. Furthermore, the system should be provided with mechanical means for removing the low molecular weight alcohols that are formed as a by-product of the reaction, thus insuring that the esterification reaction is driven to completion. The rosin alcohol esters resulting from the latter method may be transesterified in either, or both, of the R and R' positions of the thiodipropionate structure previously set forth.

It is to be noted that the rosin alcohols which are utilized to prepare the above defined esters are not commercially available as isolated compounds but are obtained, rather, as rosin alcohol mixtures of varying composition such, for example, as a mixture containing approximately 45% of tetrahydroabietyl alcohol, 40% of hydroabietyl alcohol and 15% of dehydroabietyl alcohol. Although the separation of such mixtures is not presently feasible on a commercial scale, such a separation is neither desirable nor necessary in view of the fact that these rosin alcohol mixtures are readily adaptable to the process of this invention. Moreover, separation of the rosin acids from which such alcohols are derived by means of a hydrogenation procedure is also unnecessary and undesirable for the same reasons. Therefore, for purposes of convenience, when the term "rosin alcohol" is used herein, it is meant to refer to both individual rosin alcohols as well as to mixtures of such rosin alcohols.

With regard to the proportions of the reagents which are to be utilized in the latter preparative procedures, the determination of the precise concentration of such reagents in relation to one another, as based on the stoichiometric equivalencies of the reaction, is left to the discretion of the practitioner. It is essential only that no free carboxyl groups be detectable in the resulting thiodipropionate esters; the presence of such free carboxyl groups enabling the thiodipropionates to form various by-products whose presence is highly undesirable inasmuch as they reduce the effective antioxidative properties of the desired rosin esters.

As previously noted, these synergistic combinations are useful in any natural and synthetic, hydrocarbon and substituted hydrocarbon substrate wherein oxidative or thermal degradation is a problem. Thus, the term "hydrocarbon" is meant to refer to compositions which contain only hydrogen and carbon atoms, while the term "substituted hydrocarbon" is meant to refer to compositions which, in addition to hydrogen and carbon atoms, also contain constituent groups such as oxygen, sulfur, halogens, nitrogen, etc. Among these substrates are included: synthetic homo- and copolymers which contain such monomers as ethylene, propylene, isobutylene, 1-butene, styrene, alpha-methyl styrene, the acrylic and methacrylic acid esters of aliphatic alcohols such as methyl, ethyl, propyl, butyl, isobutyl, amyl, hexyl, 2-ethyl hexyl, octyl, lauryl and stearyl alcohols, acrylic acid, methacrylic acid, isoprene, chloroprene, acrylamide, methacrylamide, acrylonitrile, methacrylonitrile, butadiene, vinyl propionate, dibutyl fumarate, dibutyl maleate, diallyl phthalate, vinylidene chloride, vinyl chloride, vinyl fluoride, and vinyl acetate; natural rubbers such as Hevea rubber, gutta-percha, balata and guayule, etc.; and, hydrocarbon-based lubricants and oils.

The antioxidant systems of this invention can be intimately admixed with the selected substrate by any suitable means and at any stage prior to the final fabrication of the substrate, which, in the case of polymeric substrates, would be at some point prior to, or simultaneous with, the milling thereof. The two antioxidant components of our novel systems may be added to the selected substrate either individually or as a combined system. They may be added in their natural physical form or, in order to achieve improved dispersion, they can be added in the form of an organic solvent solution. Thus, a typical addition technique would involve dissolving the terpene-based system in a solvent such as acetone, methylene chloride, petroleum ether, etc., adding the resulting solution to the selected substrate, thoroughly blending the resulting mixture and thereafter removing the solvent. The thus treated substrate may be immediately fabricated into a shaped article and/or utilized directly in its intended application. On the other hand, the treated substrate may be satisfactorily stored for extended periods of time and thereafter utilized in the desired application. It should be noted that polymeric and elastomeric substrates may also be stabilized by the addition of the antioxidant systems of this invention during the milling and extrusion, etc., of such substrates.

In order to provide substantially improved stability to the various substrates, it is sufficient to utilize mixtures containing as little as about 0.1% of each of the components of the antioxidant systems of this invention; the latter minimum concentration being based on the weight of the substrate. Needless to say, higher concentrations of each component may be utilized although the use of individual concentrations exceeding about 5%, by weight, is unnecessary since such a practice does not provide the proportionate increases in stability which would warrant the cost involved in employing the antioxidants at such high concentration levels. With regard to the relationship between the respective concentrations of the primary and secondary antioxidants, weight ratios ranging from about 1:10 to 10:1 are typically used.

The substrates which have been stabilized with the novel antioxidant systems of this invention exhibit long lasting resistance to oxidative and thermal degradation. These improved properties are directly attributable to the high degree of compatibility exhibited towards such substrates by our novel antioxidants as well as to their low vapor pressures and decreased tendency to migrate and/or exude from such substrates subsequent to their incorporation therein.

The following examples will further illustrate the embodiment of this invention. In these examples, all parts are given by weight unless otherwise noted.

EXAMPLE I

This example illustrates the outstanding synergistic antioxidant performance resulting from the use of the novel antioxidant systems of this invention.

A stabilizer combination which comprised 0.2 parts of tris-isobornyl phenol and 0.3 parts of a mixture of rosin alcohol thiodipropionates was dissolved in 45 parts of methylene chloride. The rosin alcohol thiodipropionate mixture which was used in the latter combination was prepared by means of a transesterification procedure wherein 30.4 parts of dimethylthiodipropionate was reacted with 97.0 parts of a rosin alcohol mixture comprising 45% tetrahydroabietol, 40% hydroabietol and 15% dehydroabietol at a temperature of 200° C. and in the presence of a catalyst comprising 0.4 parts of an 85%, by weight, aqueous phosphoric acid solution. The resulting antioxidant solution was added to 100 parts of unstabilized polypropylene and thoroughly blended therewith for a period of 15 minutes. The resulting polypropylene mix was then milled for 5 minutes on a roller mill maintained at a temperature of 370° F., whereupon a homogeneous plastic mass resulted. Plastic sheets, 20 mils in thickness, were then prepared by pressing the plastic masses between two polished aluminum plates which were maintained at a temperature of 350° F. Upon cooling, the plastic sheets were cut into two inch squares which were exposed to a degradative atmosphere by being suspended, by means of stainless steel clips, in a thermostatically controlled, forced-air oven which was at a temperature of 300° F. Daily inspection determined the extent of crazing, i.e. cracking and discoloration, and embrittlement exhibited by the samples. Upon exhibiting extensive crazing and embrittlement, the samples were removed from the testing environment and the precise period of exposure up to this point thereupon noted.

The polypropylene sheets resulting from the above described procedure were then compared with 25 mil thick, unstabilized polypropylene sheets as well as with 25 mil thick polypropylene sheets which had been admixed with 2%, by weight of polymer, of tris-isobornyl phenol; the latter sheets having been prepared and tested in a manner similar to that used for the stabilized sheets described hereinabove. In each instance, four specimens of each plastic sample were evaluated in order to check the reproducibility of the test procedure.

The results of these determinations are presented in the following table:

| Antioxidant | Elapsed Time Prior to Complete Degradation of Polypropylene Sheet (hours) |
|---|---|
| Control (no antioxidant additive) | 6-16 |
| Tris-isobornyl phenol | 6-16 |
| Combination of tris-isobornyl phenol and rosin alcohol thiodipropionate | 768-864 |

The results summarized above clearly indicate the excellent antioxdative protection afforded by the novel antioxidant systems of this invention. It further illustrates the outstanding synergistic behavior of such systems as evidenced by their performance which is greatly superior to that of the sum total of the results attained by the use of the individual components thereof.

Summarizing, this invention is seen to provide a novel class of synergistic antioxidant systems which impart excellent oxidative and thermal stability to a wide variety of substrates.

Variations may be made in procedures, proportions and materials without departing from the scope of this invention which is defined by the following claims.

What is claimed is:
1. An antioxidant composition comprising a mixture of tris-isobornyl phenol and at least one rosin alcohol ester of thiodipropionic acid corresponding to the formula:

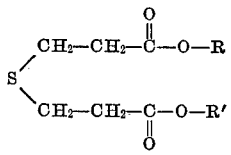

wherein R is a radical selected from the group consisting of abietyl, hydroabietyl, dehydroabietyl, tetrahydroabietyl, dihydroabietyl, levopimaryl and dextropimaryl radicals, and R' is a radical selected from the group consisting of abietyl, hydroabietyl, dehydroabietyl, tetrahydroabietyl, dihydroabietyl, levopimaryl, dextropimaryl, alkyl, cycloalkyl, aralkyl and aryl radicals.

2. The antioxidant composition of claim 1, wherein the weight ratio of tris-isobornyl phenol is rosin alcohol ester in said composition ranges from about 1:10 to 10:1.

3. A composition comprising a blend of: (1) an organic substrate which is subject to oxidative and thermal degradation; and (2) an antioxidant composition comprising a mixture of tris-isobornyl phenol and at least one rosin alcohol ester of thiodipropionic acid corresponding to the formula:

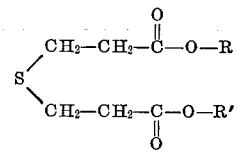

wherein R is a radical selected from the group consisting of abietyl, hydroabietyl, dehydroabietyl, tetrahydroabietyl, dihydroabietyl, levopimaryl and dextropimaryl radicals, and R' is a radical selected from the group consisting of abietyl, hydroabietyl, dehydroabietyl, tetrahydroabietyl, dihydroabietyl, leuopimaryl, dextropimaryl, alkyl, cycloalkyl, aralkyl and aryl radicals, said organic substrate being selected from the group consisting of natural rubbers, synthetic hydrocarbon polymers and substituted hydrocarbon polymers which in addition to hydrogen and carbon contain constituent groups selected from the group consisting of oxygen, sulfur, halogen and nitrogen.

4. The blend of claim 3, wherein the weight ratio of tris-isobornyl phenol to rosin alcohol ester in said antioxidant composition ranges from about 1:10 to 10:1.

5. The blend of claim 3, wherein said antioxidant composition contains at least 0.1% of said tris-isobornyl phenol and at least 0.1% of said rosin alcohol ester, the latter concentrations being based on the total weight of said substrate.

6. The blend of claim 3, wherein said substrate is polypropylene.

References Cited
UNITED STATES PATENTS

| | | | |
|---|---|---|---|
| 2,130,740 | 9/1938 | Humphrey | 260—100 |
| 2,284,156 | 5/1942 | Lemmer et al. | 260—27 |
| 3,180,850 | 4/1965 | Schooten et al. | 260—45.85 |
| 3,365,406 | 1/1968 | Kopacki et al. | 260—27 |

OTHER REFERENCES

Hercules Powder Co., Abitol, 1947, (copy in group 140) (pp. 7 to 17 relied on).

Skeist, J., Handbook of Adhesives, 1962, TP 968 S5 C. 2 (copy in group 140), (pp. 274 to 277 relied on).

DONALD E. CZAJA, Primary Examiner

WILLIAM E. PARKER, Assistant Examiner

U.S. Cl. X.R.

260—45.85, 45.95, 631.5